US011423876B2

(12) United States Patent
Kwon et al.

(10) Patent No.: US 11,423,876 B2
(45) Date of Patent: Aug. 23, 2022

(54) ELECTRONIC APPARATUS, CONTROLLING METHOD OF ELECTRONIC APPARATUS AND SERVER

(71) Applicant: Samsung Electronics Co., Ltd., Suwon-si (KR)

(72) Inventors: Taejun Kwon, Suwon-si (KR); Seongil Hahm, Suwon-si (KR); Seungsoo Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 469 days.

(21) Appl. No.: 16/260,353

(22) Filed: Jan. 29, 2019

(65) Prior Publication Data
US 2019/0259374 A1 Aug. 22, 2019

(30) Foreign Application Priority Data
Feb. 19, 2018 (KR) .......................... 10-2018-0019198

(51) Int. Cl.
*G10L 15/00* (2013.01)
*H04N 21/258* (2011.01)
(Continued)

(52) U.S. Cl.
CPC ............ *G10L 15/005* (2013.01); *G10L 15/22* (2013.01); *H04N 21/25816* (2013.01);
(Continued)

(58) Field of Classification Search
CPC . G10L 15/005; G10L 15/22; H04N 21/25816; H04N 21/4126;
(Continued)

(56) References Cited

U.S. PATENT DOCUMENTS 9,407,330 B2 * 8/2016 Jeon ..................... H04B 5/0031
9,495,961 B2 11/2016 Xiong et al.
(Continued)

FOREIGN PATENT DOCUMENTS

CN          106792855 A     5/2017
KR         10-1613320 B1    4/2016
(Continued)

OTHER PUBLICATIONS

Extended European Search Report dated Feb. 1, 2021, issued in European Application No. 19755088.2.
(Continued)

*Primary Examiner* — Md S Elahee
(74) *Attorney, Agent, or Firm* — Jefferson IP Law, LLP

(57) ABSTRACT

An electronic apparatus which registers a device to a server by using a voice, and a method therefor are provided. The electronic apparatus includes a communication circuit, a microphone, a memory for storing computer executable instructions, and at least one processor configured to execute the computer executable instructions to acquire, from a voice received through the microphone, information on an external device which a user wishes to register, based on an external device corresponding to the acquired information being searched through the communication circuit, control the communication circuit to transmit information on an access point to the external device to enable the external device to communicate with a server, and control the communication circuit to transmit a registration request with respect to the external device to the server.

12 Claims, 12 Drawing Sheets

(51) Int. Cl.
*G10L 15/22* (2006.01)
*H04N 21/436* (2011.01)
*H04N 21/422* (2011.01)
*H04N 21/41* (2011.01)

(52) U.S. Cl.
CPC . *H04N 21/42203* (2013.01); *H04N 21/43615* (2013.01); *G10L 2015/223* (2013.01); *G10L 2015/226* (2013.01); *H04N 21/4126* (2013.01)

(58) Field of Classification Search
CPC ....... H04N 21/42203; H04N 21/43615; H04N 21/44029; H04L 63/10; H04L 12/2827; G08C 19/00; G05B 15/02; H04B 5/0031
See application file for complete search history.

(56) References Cited

U.S. PATENT DOCUMENTS

| | | |
|---|---|---|
| 2008/0175187 A1 | 7/2008 | Lowry et al. |
| 2010/0031299 A1* | 2/2010 | Harrang ........... H04N 21/44029 725/80 |
| 2011/0161480 A1 | 6/2011 | Kim et al. |
| 2014/0118120 A1 | 5/2014 | Chen et al. |
| 2014/0156081 A1* | 6/2014 | Ha .......................... G05B 15/02 700/275 |
| 2014/0191855 A1* | 7/2014 | Kim ....................... G08C 17/02 340/12.54 |
| 2015/0143468 A1* | 5/2015 | Hebert .................... H04L 63/10 726/4 |
| 2016/0226676 A1* | 8/2016 | Shin .................... H04L 12/2827 |
| 2017/0070478 A1 | 3/2017 | Park et al. |
| 2017/0094511 A1 | 3/2017 | Na et al. |

FOREIGN PATENT DOCUMENTS

| | | |
|---|---|---|
| KR | 10-2017-0049817 A | 5/2017 |
| WO | 2013/158653 A1 | 10/2013 |

OTHER PUBLICATIONS

International Search Report and Written Opinion dated May 15, 2019, issued in an International application No. PCT/KR2019/001426.

* cited by examiner

ELECTRONIC APPARATUS, CONTROLLING METHOD OF ELECTRONIC APPARATUS AND SERVER

CROSS-REFERENCE TO RELATED APPLICATION(S)

This application is based on and claims priority under 35 U.S.C. § 119 of a Korean patent application number 10-2018-0019198, filed on Feb. 19, 2018, in the Korean Intellectual Property Office, the disclosure of which is incorporated by reference herein in its entirety.

BACKGROUND

1. Field

The disclosure relates to an electronic apparatus, a controlling method of the electronic apparatus, and a server. More particularly, the disclosure relates to an electronic device which registers a device to a server with a voice, a controlling method of the electronic apparatus, and a server.

2. Description of Related Art

Currently, along with the development of computer technology, communication technology, and home electronics technology, a network management service in which home and factory devices and systems are interconnected with network has emerged and is getting the spotlight as the future-oriented technology.

All devices in a home or factory connected by a network are capable of mutually transmitting data and can communicate with various electronic apparatus. For example, a user can control all home appliances in a home regardless of time and place by using a user interface (UI) provided in an electronic apparatus such as a smart phone.

In order to use this service, a device needs to be set up first and the set-up of a device requires a procedure to register a device to a server.

A device is registered using an application of a smart phone according to the related art. Therefore, a smartphone is essential for using the device, and all users have to install the application on their own smartphone. In addition, in order to register a plurality of devices, there has been a problem that a user has to manually register each device sequentially.

As such, a method of registering each device by utilizing an application of a smartphone requires a long time, and there is a difficulty for the elderly to use this method. Also, since anyone can use the device by using the smartphone in which the application is installed, there is a problem that the device could be used by others.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus capable of registering a device to a server easily using a voice, a controlling method of the electronic apparatus, and a server.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communication circuit, a microphone, a memory for storing computer executable instructions, and at least one processor configured to execute the computer executable instructions to acquire, from a voice received through the microphone, information on an external device which a user wishes to register, based on an external device corresponding to the acquired information being searched through the communication circuit, control the communication circuit to transmit information on an access point (AP) to the external device to enable the external device to communicate with a server, and control the communication circuit to transmit a registration request with respect to the external device to the server.

In accordance with another aspect of the disclosure, a server is provided. The server includes a communication circuit comprising circuitry, a memory for storing computer executable instructions, and at least one processor configured to execute the computer executable instructions to receive a voice from an electronic apparatus through the communication circuit, based on the voice being related to registration of a first device, control the communication circuit to transmit information on the first device to the electronic apparatus, and based on a registration request for the first device being received from the electronic apparatus, perform a registration procedure for the first device.

In accordance with another aspect of the disclosure, a controlling method of an electronic apparatus is provided. The controlling method of an electronic apparatus includes acquiring, from a voice received through the microphone, information on an external device which a user wishes to register, and based on an external device corresponding to the acquired information being searched, transmitting information on an AP to the external device to enable the external device to communicate with a server, and transmitting a registration request with respect to the external device to the server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
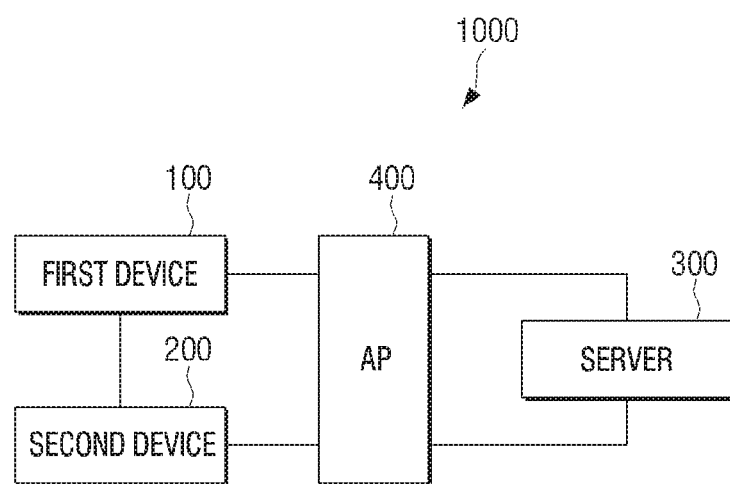
FIG. 1 is a view to describe a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, the terms used in the Specification and claims have chosen generic terms in view of their function in various embodiments of the disclosure. However, these terms may vary depending on the intentions, legal or technical interpretations of the artisan skilled in the art, and the emergence of new technologies. In addition, some terms may be terms arbitrarily selected by the applicant. These terms may be construed in the meaning defined herein and, unless otherwise specified, may be construed on the basis of the entire contents of this Specification and common technical knowledge in the art.

In the following description, like drawing reference numerals are used for like elements, even in different drawings. The matters defined in the description, such as detailed construction and elements, are provided to assist in a comprehensive understanding of the embodiments. However, it is apparent that the embodiments may be practiced without those specifically defined matters. Also, well-known functions or constructions are not described in detail since they would obscure the description with unnecessary detail.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

In the example embodiments of the disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor.

Further, in the embodiment of the disclosure, when a part is connected to another part, this includes not only a direct connection but also an indirect connection through another medium. Also, the meaning that a part includes an element does not exclude other elements, but may include other elements, unless specifically stated otherwise.

The disclosure will be described in greater detail below with reference to the accompanying drawings.

The electronic apparatus according to various embodiments may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an moving picture experts group phase 1 or phase 2 (MPEG-1 or MPEG-2) audio layer-3 (MP3) player, a mobile medical device, a camera, or a wearable device. According to various embodiments, the wearable device may be of the type of accessory (e.g., a watch, a ring, a bracelet, a bracelet, a necklace, glasses, a contact lens or a head-mounted-device (HMD)), a fabric or clothing (e.g., an electronic garment), a body attachment (e.g., a skin pad or tattoo), or a bio-implantable (e.g., implantable circuit).

In another embodiment, the electronic apparatus may be a home appliance. Home appliances may include at least one of, for example, televisions (TVs), digital video disc (DVD) players, audio, refrigerators, air-conditioners, vacuum cleaners, ovens, microwaves, washing machines, air cleaners, set-top box, home automation control panel, a security control panel, a TV box such as Samsung HomeSync™, Apple TV™ or Google TV™), a game console (e.g., Xbox™, PlayStation™), an e-dictionary, an electronic key, a camcorder, or an electronic photo frame.

In another embodiment, the electronic apparatus 100 (e.g., first device 100) may include at least one of a variety of medical devices such as various portable medical measurement devices (a blood glucose meter, a heart rate meter, a blood pressure meter or a temperature measuring device, a magnetic resonance angiography (MRA), a magnetic resonance imaging (MRI), computed tomography (CT), a photographing device, or an ultrasonic device, etc.), a navigator, global navigation satellite system (GNSS), an event data recorder (EDR), a flight data recorder (FDR), automotive infotainment devices, marine electronic equipment (e.g., marine navigation devices, gyro compasses, etc.), avionics, security devices, head units for the vehicle, industrial or home robots, automatic teller's machine (ATM), point of sales (POS) of a store, or internet of things (e.g., light bulbs, various sensors, electricity or gas meters, sprinkler devices, fire alarms, thermostats, street lights, a toaster, a fitness equipment, a hot water tank, a heater, a boiler, etc.).

In another embodiment, the electronic apparatus 100 may include at least one of a piece of furniture or a part of a building/structure, an electronic board, an electronic signature receiving device, a projector, or various measuring devices (e.g., water, electricity, gas, or radio wave measuring instruments, etc.). In various embodiments, the electronic apparatus may be a combination of one or more of the various devices described above. The electronic apparatus according to some embodiments may be a flexible electronic apparatus. Further, the electronic apparatus according to the embodiment of the disclosure is not limited to the above-described devices, and may include a new electronic apparatus according to technological advancement.

FIG. 1 is a view to describe a system 1000 according to an embodiment of the disclosure.

Referring to FIG. 1, a system 1000 includes a first device 100, a second device 200, a server 300, and an access point (AP) 400.

The first device 100 is an electronic apparatus and may be a home appliance such as a TV, an air-conditioner, a refrigerator, a washing machine, a robot cleaner, a humidifier, a door lock, a dish washer, a security camera, a closed circuit television (CCTV), a security sensor, light emitting diode (LED), a lamp, a heating device, a power measuring device, a power socket, an electricity socket, a multi-tap, personal computer (PC), internet protocol (IP) camera, internet telephone, wired/wireless telephone, electrically-controllable curtain, and blind.

The first device 100 may communicate with an external device such as the second device 200 and the server 300. For example, the first device can communicate with an external device by communication methods such as Wi-Fi, ZigBee, and Z-Wave.

The second device 200 is a device that can register the first device 100 on the server 300 based on the user's voice. The second device 200 may be a device pre-registered in the server 300. The registration of the second device 200 can be performed through a third device, for example, a user terminal device 500 shown in FIG. 11.

The second device 200 may control the first device 100 based on a user's voice.

The second device 200 is an electronic apparatus which can be operating by a voice command and includes a microphone. The second device 200 may be an apparatus, for example, a smartphone, a tablet, and a digital TV, or an artificial intelligent speaker that can perform an action in response to a user command as if the speaker has a conversation with a user.

The second device 200 may interact with the first device 100 through the server 300 or by using device-to-device (D2D) or peer-to-peer (P2P) connection.

The second device 200 may execute a smart home application and provide various services to the user through its own display. The smart home application may be embedded in the second device 200 or downloaded from an app store such as Google Play™ or Samsung Apps™. The first device 100 can be registered or controlled in the server 300 by executing the smart home application in the second device 200.

The server 300 may be implemented as a cloud server. According to one embodiment, the server 300 may include an account server and a service server. The account server can perform user authentication. In particular, the account server can perform user authentication based on voice recognition. The service server can perform functions such as web portal, status information management of devices, remote access, device update, message notification, and so on.

A service provided by the system 1000 can be largely divided into device registration and device control.

Device registration is a procedure, for example, that the second device 200 supports a new first device 100 to access the access point (AP) 400, and registers the first device 100 to the server 300.

Device control is a procedure that a user controls the first device 100 registered in the server 300 through the server 300 using the second device 200 or a device different from the second device 200.

When the first device 100 and the second device 200 are used at home, they can be called a home device. The first device 100, the second device 200 and the server 300 can communicate directly or through the home gateway. The home gateway can manage and control the home devices, in overall, in the home network including the first device 100 and the second device 200 in cooperation with the server 300.

Figure 2:
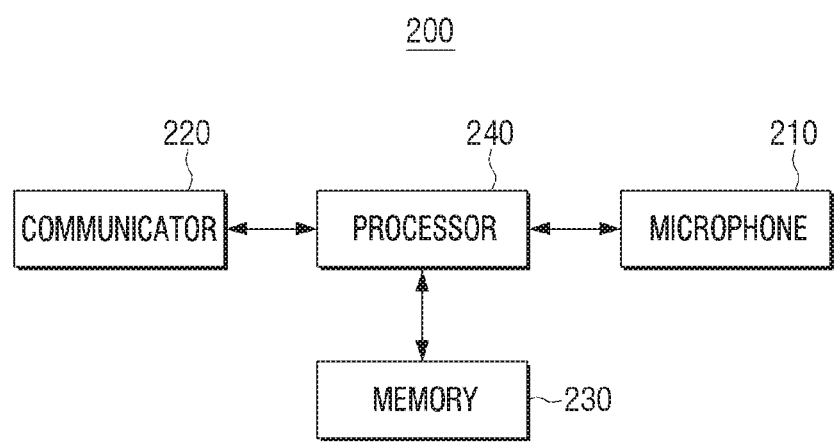
FIG. 2 is a block diagram to describe a configuration of an electronic apparatus according to an embodiment of the disclosure.

FIG. 2 is a block diagram to describe a configuration of an electronic apparatus according to an embodiment of the disclosure.

Referring to FIG. 2, the second device 200 includes a microphone 210, a communicator 220 (e.g., a communication circuit or a transceiver), a memory 230, and a processor 240 (e.g., at least one processor).

The microphone 210 is a structure for receiving sound. The microphone 130 may convert the received sound into an electrical signal. The microphone 210 may be implemented integrally with or separated from the second device 200. The separated microphone 210 may be electrically connected to the second device 200.

The communicator 220 may include various communication circuitry to perform communication with various types of external devices. The communicator 220 may communicate with an external device using at least one of Wi-Fi, Bluetooth, near field communication (NFC), infrared data association (IrDA), radio frequency identification (RFID), ultra-wide band (UWB), Wi-Fi direct, Z-wave, internet protocol version 4 (IPv4) over low-power wireless personal area networks (4LoWPAN) or 6LoWPAN, general packet radio services (GPRS), Weightless, digital living network alliance (DLNA), ANT+, digital enhanced cordless telecommunications (DECT), wireless local area network (WLAN), global system for mobile communications (GSM), universal mobile telecommunication system (UMTS), and wireless broadband (WiBRO). The communicator 220 may be implemented as a communication chip and a transceiver to perform communication as described above.

The memory 230 may, for example, include an embedded memory 232 or an external memory 234. The embedded memory 232 may, for example, include at least one of a volatile memory (e.g. dynamic random access memory (DRAM)), a static RAM, a synchronous dynamic RAM (SDRAM), a non-volatile memory (e.g. one time programmable read only memory (OTPROM)), a programmable ROM (PROM), an erasable and programmable ROM (EPROM), an electrically erasable and programmable ROM (EEPROM), a mask ROM, a flash ROM, a flash memory (e.g. NAND flash or NOR flash, etc.), a hard drive, and a solid state drive (SSD).

The external memory may further include a flash drive, such as a compact flash (CF), a secure digital (SD), a micro secure digital (Micro-SD), a mini secure digital (Mini-SD), an extreme digital (xD), a multi-media card (MMC), or a memory stick. The external memory may be connected to the electronic apparatus 201 functionally and/or physically through various interfaces.

The memory 230 may be implemented as not only a storage medium inside the second device 200 but also a web server through network, and so on.

The memory 23 is accessed by the processor 240, and read/write/modify/delete/update of data by the processor 240 can be performed. The term memory in this document refers to the memory 230 (not shown), a ROM in the processor 240, a RAM, or a memory card (for example, a micro SD card and a memory stick) provided on the second device 200. The memory 230 may store computer executable instructions.

The processor 240 is a configuration for controlling the overall operation of the second device 200. The processor 240 may be implemented, for example, as a central processing unit (CPU), an application specific integrated circuit (ASIC), a system on chip (SoC), a MICOM, or the like. The processor 240 may operate an operating system or an application program to control a plurality of hardware or software components connected to the processor 240, and may perform various data processing and operations. According to one embodiment, the processor 240 may further include a graphics processing unit (GPU) and/or an image signal processor. The processor 240 may execute the computer executable instructions to perform the functions of the second device 200 according to various embodiments of the disclosure.

For example, the processor 240 may acquire information on an external device that the user desires to register from the voice received through the microphone 210, and when an external device corresponding to the acquired information is searched through the communicator 220 from among the external devices, the processor may control the communicator 220 to transmit, to the external device, information on the access point 400 so that the external device can communicate with the server 300, and control the communicator 220 to transmit a request for registration with respect to the external device to the server 300.

Here, the processor 240 may search for an external device whose service set identifier (SSID) includes the acquired information on the external device.

Information on an access point 400 which the second device 200 transmits to an external device may be information used by the second device 200 to contact the access point 400.

According to one embodiment, the processor 240 uses the learned speech recognition model using the artificial intelligence (AI) algorithm stored in the memory 230 and may acquire information on an external device which the user wishes to register from voice received through the microphone 210.

According to still another embodiment, the server 300 may have a learned speech recognition model using an artificial intelligence algorithm, and the processor 240 may control the communicator 220 to transmit the voice received through the microphone 210 to the server 300, and receive information on an external device from the server 300 through the communicator 220.

The processor 240, when information on a plurality of external devices which a user desires to register is acquired from the voice received through the microphone 210, may control the communicator 220 to transmit information on the access point sequentially to the plurality of external devices and control the communicator 220 to transmit a registration request for the plurality of external devices to the server 300.

According to an embodiment, the second device 200 further includes a speaker, and when the information about the external device to which the user wants to register is acquired from the voice, the processor 240 controls the communicator 220 to transmit control information for causing the external device to output information indicating that the external device is to be registered, outputs an inquiry voice to register the external device through a speaker, and when voice to agree the inquiry voice is received through the microphone 210, controls the communicator 220 to transmit the information on the access point to the external device, and controls the communicator 220 to transmit a registration request with respect to the external device to the server 300.

According to an embodiment, the processor 240, when audio data including a voice indicating that registration of the external device is completed is received from the server 300, may control a speaker of the second device 200 to output the audio data.

Figure 3:
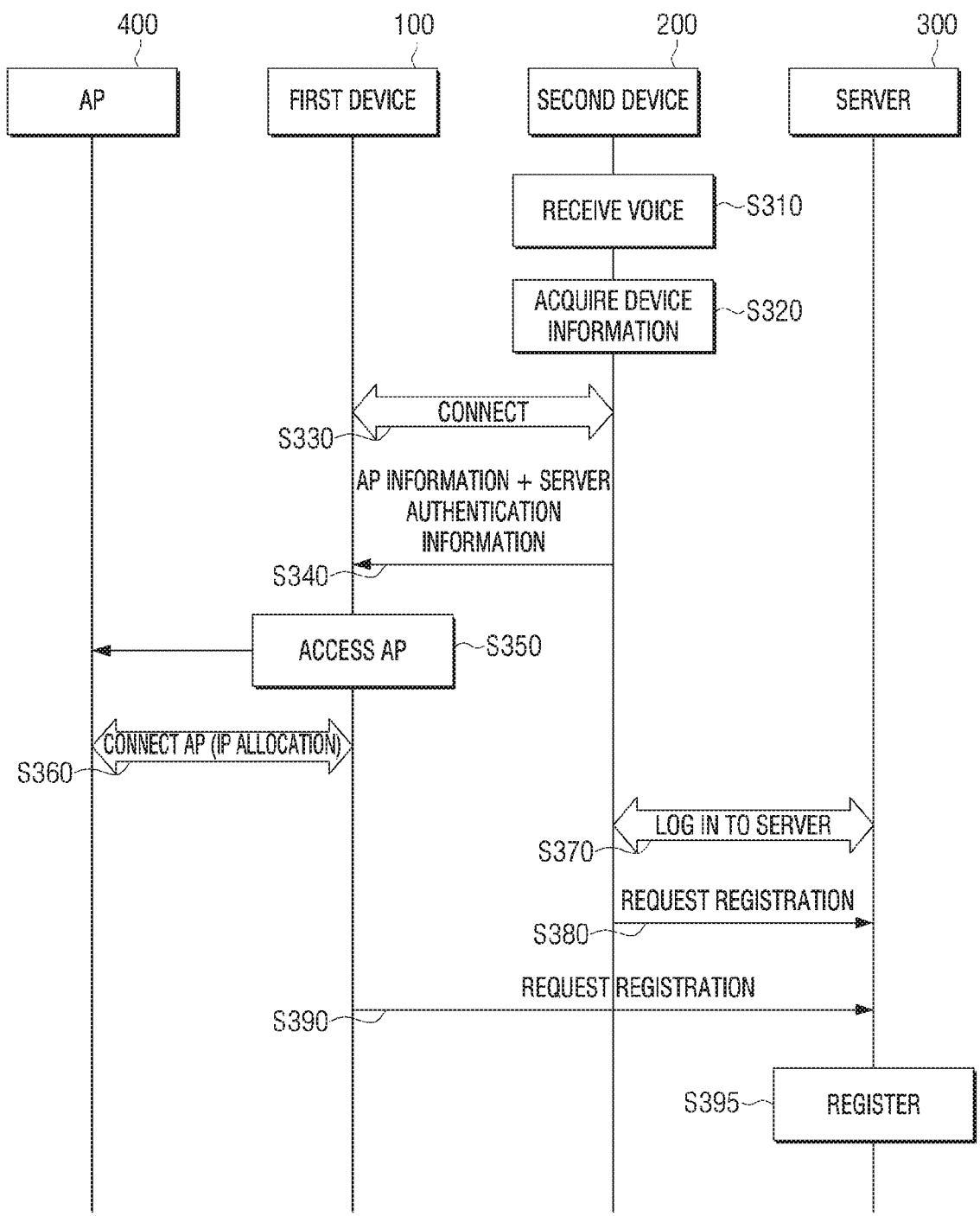
FIG. 3 is a flowchart to describe a procedure to register a device to a server according to an embodiment of the disclosure.

FIG. 3 is a view to describe a procedure to register the first device according to an embodiment to the server 300. Here, the second device 200 may be a device previously registered in the server 300.

Referring to FIG. 3, the user speaks to register the first device 100, and the user's voice is received through a microphone 210 of the second device 200 in operation S310. For example, if the first device 100 is a refrigerator, the user can say "register refrigerator." Alternatively, the user may include a trigger word to activate a voice command function of the first device 100. For example, a user can say "Bixby, register a refrigerator."

The second device 200 acquires information about a device to be registered by the user from the received voice in operation S320. For this, an analysis process for voice can be performed. For example, the second device 200 may transmit the received voice to the server 300, and the server 300 may include a speech recognition model and may obtain context information from the voice received using the speech recognition model. The speech recognition model may be an artificial intelligence model learned by artificial intelligence algorithms. For example, the speech recognition model may include a Speech to Text (SPP) module for converting speech to text, and a Natural Language Understanding (NLU) module for processing natural language understanding of the converted text. The server 300 may transmit the context information of the voice to the second device 200. The context information may include information on the first device and information indicating that the first device is to be registered. Here, the information about the first device may include the name of the first device. The server 300 may use a word which a user speaks as it is or use a modified word as a name of the first device. For example, even if the user says "register a TV," the server 300 can use "TV" rather than "television" as a name of the device. The name of the first device may be provided in a language corresponding to the user's voice. According to one embodiment, if the language corresponding to the user's voice is not English, the server 300 may provide a translation of the first device name into English.

As described above, the second device 200 can acquire information of a device to be registered through the server 300. According to still another embodiment, the second device 200 includes a speech recognition model, and the second device 200 can acquire information on the device that the user intends to register from the voice.

The second device 200 can communicate with the first device 100 based on the information about a device which the user wishes to register that is acquired by the user from the voice in operation S330. The connection between the second device 200 and the first device 100 will be described below.

According to an embodiment, the first device 100 may execute a soft AP function, allow access of the second device 200 as if the AP to connect communication with the second device 200.

Specifically, the first device 100 may transmit a beacon periodically by executing a soft AP function. The beacon is a signal for allowing the first device 100 to inform its surroundings of its existence so that a peripheral device can detect the first device and participate in the mutual communication. The beacon may include a Service Set Identifier (SSID), a beacon interval, capability information, and the like of the first device 100 and may be variously expressed using a vendor specific field.

The soft AP function can be executed manually or automatically. According to the embodiment that is manually performed, for example, the soft AP function can be executed by pressing a button or the like provided on the first device 100 by the user. According to the embodiment that is automatically performed, when the first device 100 is not registered in the server 300, the first device 100 can automatically execute the soft AP function. For example, when the user purchases the first device 100 and connects the power source, the first device 100 can automatically execute the soft AP function. According to still another embodiment, it is also possible for the second device 200 to execute the AP function of the first device 100. For example, when the user utters a voice to register a specific device, the second device 200 can transmit a signal (IR signal, ultrasonic signal, etc.) for executing the AP function. The first device 100 includes a configuration capable of receiving a signal transmitted from the second device, and execute the AP function by receiving the signal.

According to one embodiment of the disclosure, the SSID contained in the beacon transmitted by the first device 100 may include a character string that allows the first device to recognize what the first device is, and can be uniquely assigned to each device or by devices of the same model. If necessary, the SSIDs can be dynamically allocated, and al located using a specific rule through the application. When the first device 100 is, for example, a smart home device (a device supporting the IoT function), the SSID can be generated based on a smart home protocol (SHP), which is an indicator indicating that the smart home device, types of a device, a production date, a version and so on. For example, if the first device 100 is a refrigerator that supports smart home functionality and is produced in 2014, the SSID 501 of the first device 100 may be configured as "SHP-.Fridge.2014."

When the beacon is received, the second device 200 may analyze information included in the beacon and determine whether the first device 100 transmitting the beacon corresponds to the device that the second device 200 desires to register. For example, the second device 200 may acquire information about a device to be registered by the user from the voice, check whether the beacon includes the information corresponding to the acquired information, and determine whether the first device 100 corresponds to the device which the first device 100 would like to register. For example, if the information about the device obtained from the voice includes the word "Fridge", it can be determined that the first device 100 whose SSID "SHP.Fridge.2014" includes "Fridge" is a device which a user wishes to register.

If it is determined that the first device 100 transmitting the beacon is a device which the user wishes to register, the second device 200 may communicate with the first device 10 using information included in the beacon.

According to still another embodiment of the disclosure, when the second device 200 acquires information on a device to be registered by a user from a voice, the second device may broadcast a probe request, and the first device 100 which detects the probe request can transmit the probe response to the second device 200. The probe response may include information such as an SSID as the beacon described above. In the same manner as the embodiment in which the beacon is used, the second device 200 may analyze the information included in the probe response and determine whether or not the first device 100 that has transmitted the probe response corresponds to the device that the user intends to register. If it is determined that the first device 100 transmitting the probe response corresponds to the device to be registered, the second device 200 may communicate with the first device 100 using the information included in the probe response.

According to still another embodiment, the first device 100 and the second device 200 can be communicated via Wi-Fi P2P.

Specifically, when the first device 100 and the second device 200 enter the P2P terminal discovery mode, they can perform the P2P terminal search. For example, the first device 100 and the second device 200 may be configured such that an application using Wi-Fi P2P is automatically activated according to a user's input or need, or enter a P2P terminal search mode by a request of Wi-Fi simple configuration (WSC), and so on. For example, the second device 200 may enter the P2P terminal search mode when context information including information indicating that the device 300 is to be registered is received from the server 300. Then, the second device 200 can transmit a signal (IR signal, ultrasonic signal, etc.) for entering the P2P terminal search mode, and the first device 100 can receive the signal and enter the P2P terminal search mode.

The second device 200 performs a Wi-Fi P2P search to detect a device that the user intends to register. Here, the Wi-Fi P2P search includes a device discovery process for recognizing each other and a service discovery process for a device discovered through the device search process. Through such device search and service search processes, a user can determine a device to be registered.

Specifically, in the service discovery process, it is possible to know what services a counterpart device supports through a service discovery query and a service discovery response. For example, the service protocol type field of the service discovery response includes a value corresponding to a service protocol type indicating which service is supported. For example, if the value 1 is Bonjour, the value 2 is UpnP, the value 3 is WS-Discovery, the value 4 is an identifier indicating that the device type is a refrigerator, and the value 5 is an identifier indicating that the device type is an air-conditioner, when a device has a value of "4," the device can be determined as a refrigerator. The service protocol type corresponding to the device type may be assigned to a value that is not used by another service protocol or a vendor specific value.

The second device 200 may receive a value corresponding to a service protocol type from the first device 100 and if the received value corresponds to the device information acquired from the voice, the second device may determine that the first device 100 is a device the user wishes to register.

The second device 200 performs a Wi-Fi P2P connection with the first device 100 that is determined to be a device a user wishes to register. Specifically, the first device 100 and the second device 200 may perform a Provision Discovery Exchange and perform provisioning to form a Wi-Fi P2P connection.

In the above description, it has been described that the first device 100 and the second device 200 are connected by the Soft Ap and the Wi-Fi P2P communication method. However, the first device 100 and the second device 200 can be connected using various communication methods such as bluetooth low energy (BLE), Bluetooth, ZigBee, radio frequency (RE) communication, Z-wave, and so on.

When connection between the first device 100 and the second device 200 is established, the second device 200 may transmit information about the pre-stored access point (AP) 400 to the first device 100 in operation S340. The information about the AP 400 may be information about the AP 400 to which the second device 200 has previously been connected. The information on the AP 400 may include an SSID and a security type of the AP 400, an encryption type, a security key, and the like. In addition, the second device 200 may transmit the server authentication information to the first device 100. The server authentication information is information used by the first device 100 to make a registration request to the server 300. The second device 200 may request to the server 300 the server authentication information to be used by the first device 100 and receive the same.

Though not illustrated in FIG. 3, communication is established between the first device 100 and the second device 200, and the first device 100 may transmit identification information of the first device 100 to the second device 200. The identification information of the first device 100 is information for allowing another device to identify the first device 100 and may include information such as a type, a name, a description, a manufacturer, a model ID, serial number, a sales location, versions, and so on.

The identification information of the first device 100 is temporarily stored in the second device 200 before the information of the first device 100 is registered in the server 300, and after the information is registered in the server 300, the information can be removed from the first device 100. The identification information of the first device 100 received by the second device 200 can be used in the registration request of the first device in operation S380.

Thereafter, through it is not illustrated, the first device 100 and the second device 200 can be disconnected. The second device 200 can be connected to the AP 400.

The first device 100 may access the AP 400 using the information about the AP 400 transmitted from the second device 200 in operation S350. The first device 100 may be connected to the network by receiving an IP address from the AP 400 in operation S360. The first device 100 can communicate with an external device such as the server 300 through the AP 400. The first device 100 may send an advertisement message that includes information that the first device is connected to the network to the second device 200.

The second device 200 can log in to a user account of the server 300 based on the user's voice received in operation S310 (S370). Since the voice includes information that allows the user to be identified, such as a fingerprint, the voice can play a role such as an ID and a password. Specifically, the second device 200 may transmit the voice of the user to the server 300, and when the voice feature information of the user pre-registered the server 300 and the feature information of the voice transmitted to the server 300 correspond to each other, a login can be made. It is possible that the login may also be performed in operation S310.

The second device 200 may then transmit, to the server 300, a registration request requesting registration of the first device 100 in operation S380. At this time, the transmitted registration request may include the identification information of the first device 100 and may include information on the installation location of the second device 200.

The first device 100 may transmit to the server 300 a registration request using the server authentication information in operation S390. The transmitted registration request may include identification information of the first device 100.

When the registration request received from the second device 200 and the registration request received from the first device 100 correspond to each other, the server 300 may register the first device 100 to a user account logged in by voice in operation S395, Here, the server 300, if identification information of the first device included in the registration request received from the second device 200 and the first identification information of the first device included in the registration request from the first device 100 are the same from each other, may register the first device 100 to a user account. In this case, the identification information of the first device 100 and the information on the installation location of the second device 200 may be registered as information on the first device.

The server 300 can transmit control information to the first device 100 so that information indicating the completion of the registration of the first device 100 is output from the first device 100. If the first device 100 includes a display, a message such as "registration is completed" may be output via the display. When the first device 100 includes a speaker, a voice such as "registration is completed" may be output through the speaker.

The server 300 may transmit control information to the second device 200 so that information indicating completion of registration of the first device 100 is output from the second device 200. If the registered first device is a refrigerator and the second device 200 includes a speaker, a voice "registration of the refrigerator is completed" may be outputted through the speaker, and if the second device 200 includes a display, the message "registration of the refrigerator is completed" can be output through the display.

According to still another embodiment of the disclosure, when information about a plurality of devices to be registered by the user is obtained from the voice received through the microphone 210 of the second device 200, the plurality of devices can be registered in the server 300. This will be described with reference to FIG. 5.

Figure 5:
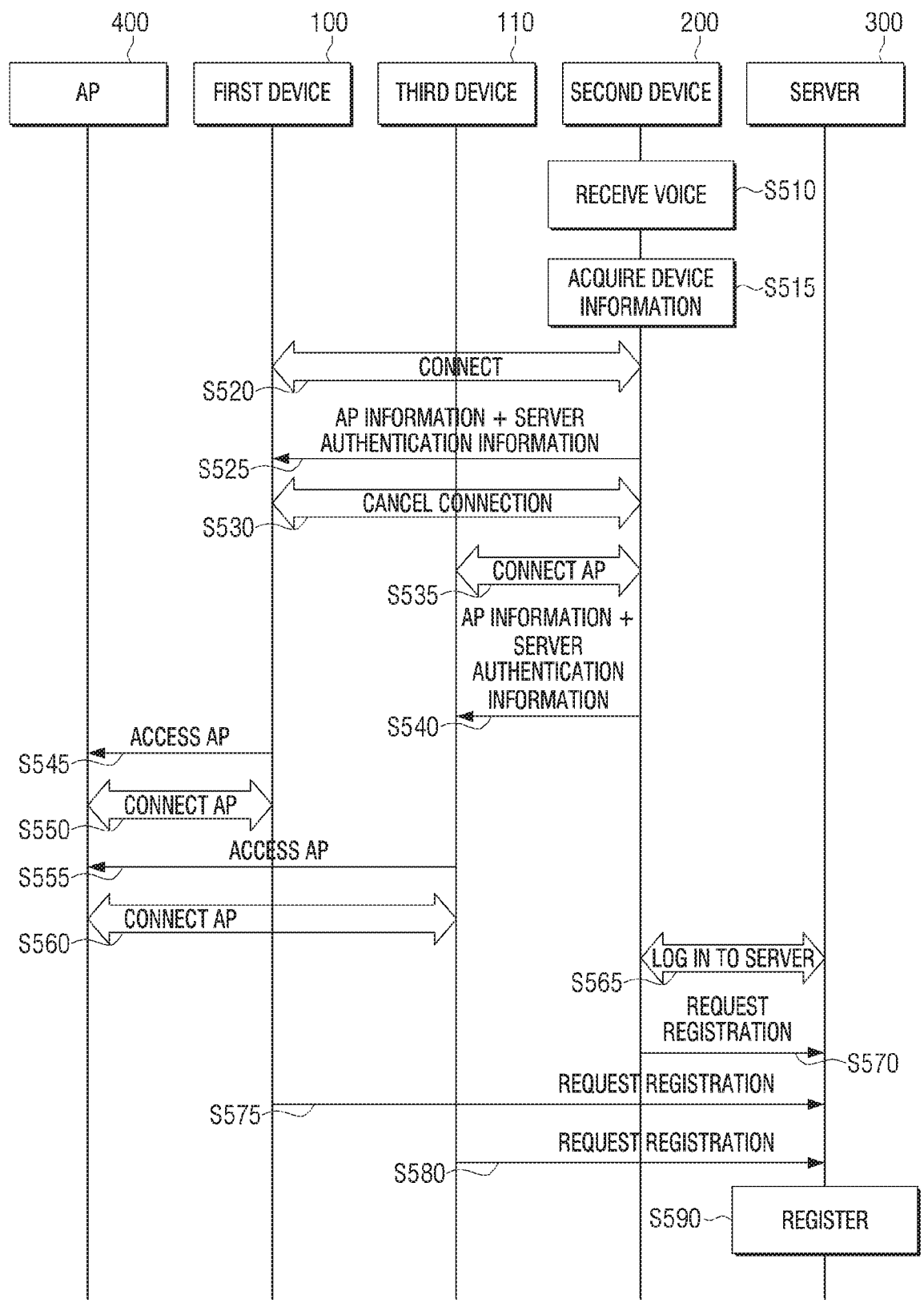
FIG. 5 is a flowchart to describe a procedure to register a plurality of devices at a time according to an embodiment of the disclosure.

FIG. 5 is a flowchart to describe a procedure to register a plurality of devices at a time according to an embodiment of the disclosure.

In the embodiment referring to FIG. 3, it has been described an example that only one first device 100 is registered, in FIG. 5, an example of registering the first device 100 and a third device 110 at the same time will be described.

Figure 4:
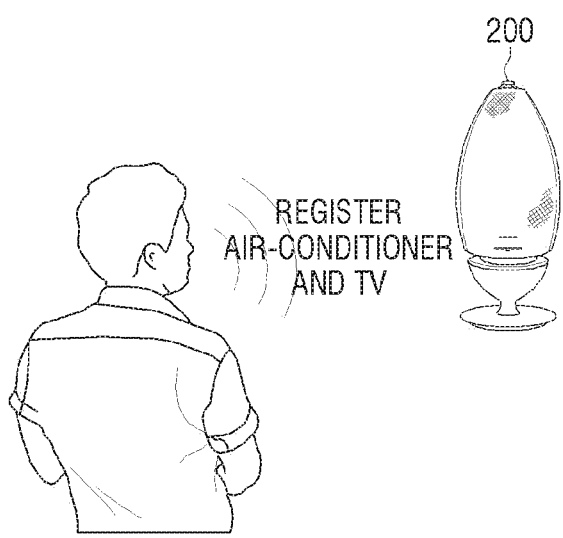
FIG. 4 is a view to describe a method for registering a device with a voice according to an embodiment of the disclosure.

Referring to FIG. 5, the user speaks to register the first device 100, and the voice of the user is received through the microphone 210 of the second device 200 in operation S510. For example, if the first device 100 is a refrigerator and the third device is a TV, the user can speak "register a refrigerator and TV" as shown in FIG. 4. Alternatively, the user may speak including a trigger word for activating the voice command function of the first device 100. For example, a user may say "Bixby, register a refrigerator and TV."

FIG. 4 is a view to describe a method for registering a device with a voice according to an embodiment of the disclosure.

The second device 200 acquires information about a device that the user wishes to register from the received voice in operation S515. Information can be obtained from the voice as described in operation S320 of FIG. 3. For example, the second device 200 may transmit the received voice to the server 300, and the server 300 may obtain the context information from the received voice using the speech recognition model. The server 300 may transmit the context information acquired from the voice to the second device 200. The context information may include information on the first device 100 and the third device 110 and information indicating that the first device 100 and the third device 110 are to be registered.

As described above, the second device 200 can acquire information of a device to be registered through the server 300. According to still another embodiment, the second device 200 includes a speech recognition model, so that the second device 200 can acquire information on the device that the user wishes to register from the voice.

If the second device 200 determines that the user wants to register a plurality of devices based on the information about the device that the user wishes to register, the second device 200 can sequentially establish communication with the plurality of devices. First, the second device 200 can establish a communication connection with the first device 100 in operation S520. In this case, communication can be established as described in operation S330 of FIG. 3.

When communication is established between the first device 100 and the second device 200, the second device 200 may transmit information about the pre-stored access point (AP) 400 to the first device 100 in operation S525. In addition, the second device 200 may transmit the server authentication information to the first device 100. The first device 100 may transmit the identification information of the first device 100 to the second device 200. The identification information of the first device 100 received by the second device 200 may be used in the registration request in operation S570.

The second device 200 may disconnect connection with the first device 100 to be connected to the third device 110 in operation S530.

After the disconnection, the second device 200 may establish connection with the third device in operation S535. Here, as described in S330 of FIG. 3, communication connection can be established.

When communication is established between the first device 100 and the third device 110, the second device 200 may transmit information about the pre-stored access point (AP) 400 to the third device 110 in operation S540. Also, the second device 200 may transmit the server authentication information to the third device 110. The third device 110 may transmit the identification information of the third device 110 to the second device 200. The identification information of the third device 110 received by the second device 200 may be used for the registration request in operation S570.

Then, the second device 200 may disconnect connection with the third device 110 and access the AP 400.

The first device 100 may access the AP 400 using the information about the AP 400 transmitted from the second device 200 in operation S545. The first device 100 may be connected to the network by receiving an IP address from the AP 400 in operation S550. The first device 100 can communicate with an external device such as the server 300 through the AP 400. The first device 100 may transmit, to the second device 200, an advertisement message that includes information that the first device is connected to the network.

Likewise, the third device 110 can access the AP 400 using the information about the ALP 400 transmitted from the second device 200 in operation S555. Then, the third device 110 is allocated with an IP address from the AP 400 and can be connected to the network in operation S560. The third device 110 can communicate with an external device such as the server 300 through the AP 400. The third device 110 may transmit, to the second device 200, an advertisement message which includes information that the third device 110 is connected to the network.

Thereafter, the second device 200 may log in to the user account of the server 300 based on the user's voice received in the operation S510 in operation S565. As described in S370 of FIG. 3, log-in can be performed.

Thereafter, the second device 200 may transmit, to the server 300, a registration request requesting registration of the first device 100 and the third device 110 in operation S570. At this time, the transmitted registration request may include the identification information of the first device 100 and the identification information of the third device 110, and may further include information on the installation location of the second device 200.

The first device 100 may transmit the registration request to the server 300 using the server authentication information in operation S575. At this time, the transmitted registration request may include the identification information of the first device 100. The third device 110 may similarly transmit the registration request to the server 300 using the server authentication information in operation S580. Here, the transmitted registration request may include identification information of the third device 110.

When the registration request received from the second device 200 and the registration request received from the first device 100 correspond to each other, the server 300 may register the first device 100 and the third device 100 to a user account which is logged in with voice in operation S590. At this time, the server 300, only in a case where the identification information of the first device included in the registration request received from the second device 200 and the identification information of the first device included in the registration request received from the first device 100 are the same from each other, may register the first device 100 to a user account, and only in a case where the identification of the third device included in the registration request received from the second device 200 and the identification information of the third device included in the registration request received from the third device 110 are the same from each other, may register the third device 100 to a user account. In this case, the identification information of the first device 100 and the information of the installation location of the second device 200 can be registered as the information of the first device, and the identification information of the third device 110 and the information on installation position of the second device 200 can be registered as the information on the third device.

After that, the server 300 can transmit control information to the first device 100 so that information indicating the completion of registration of the first device 100 is output from the first device 100, and transmit, to the third device 110, control information for causing the third device 110 to output information informing completion of registration of the first device 110.

According to still another embodiment of the disclosure, the server 300 may transmit control information for causing the second device 200 to output information indicating completion of registration of the first device 100 and the third device 110 to the second device 200. In the case where the second device 200 includes a speaker, a voice of "the registration of the refrigerator and the TV is completed" can be outputted through the speaker, and when the second device 200 includes the display, "the registration of the refrigerator and TV is completed" may be output on the display.

According to an embodiment with reference to FIG. 5, there is an advantage that a user does not need to have an irritating process that a user needs to register each of a plurality of devices when registering a plural of devices.

Figure 6:
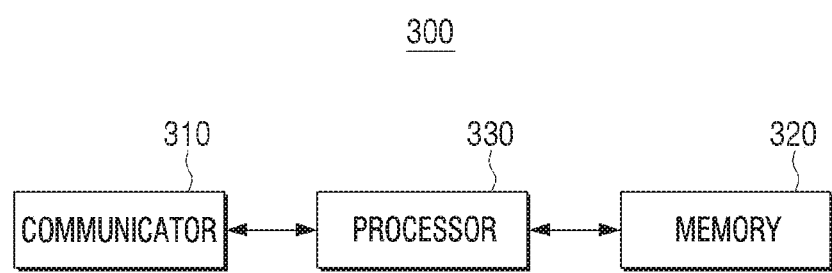
FIG. 6 is a block diagram to describe a configuration of a server according to an embodiment of the disclosure.

FIG. 6 is a block diagram to describe a configuration of a server 300 according to an embodiment of the disclosure.

The server 300 may be implemented as a cloud server, and can be divided into a plurality of servers according to functions. For example, the server 300 may include an account server and a service server. The account server can perform user authentication. In particular, the account server can perform user authentication based on voice recognition. The service server can perform functions such as web portal, information management for smart home devices, service interface for 3rd party application, remote access, device update, message notification, and so on.

Referring to FIG. 6, the server includes a communicator 310 (e.g., a communication circuit or a transceiver), the memory 320, and a processor 330 (e.g., at least one processor).

The communicator 310 (e.g., a communication circuit or transceiver) may include various communication circuitry for performing communication with various types of external devices. The communicator 310 may communicate with an external device using at least one of Wi-Fi, Bluetooth, near field communication (NFC), infrared data association (IrDA), radio frequency identification (RFID), ultra-wideband (UWB), Wi-Fi Direct, Z-wave, 4LoWPAN, GPRS, Weightless, Digital Living Network Alliance (DLNA), ANT+, Digital Enhanced Cordless Telecommunications (DECT), Wireless Local Area Network (WLAN), Global System for Mobile communications (GSM), Universal Mobile Telecommunication System (UNITS) wireless broadband (WiBRO), and the like. The communicator 310 may be implemented as a communication chip and a transceiver for performing the communication method described above.

A memory 320 may include, for example, internal memory or external memory. The internal memory may include at least one of a volatile memory such as a dynamic RAM (DRAM), a static RAM (SRAM), or a synchronous dynamic RAM (SDRAM); and a non-volatile memory such as an one-time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), hard drive, or solid state drive (SSD).

The external memory may be a flash drive, for example, a compact flash (CF), a secure digital (SD), a micro secure digital (Micro-SD), mini secure digital (Mini-SD), extreme digital (xD), multi-media card (MMC), or a memory stick. The external memory may be functionally and/or physically connected to the server 300 via various interfaces.

The memory 320 is accessed by the processor 330, and data read/write/modify/delete/update by the processor 330 can be performed. The term memory in the disclosure may include the memory 320, a ROM in processor 330, a RAM, or a memory card (e.g., micro SD card, memory stick) mounted in the server 300. The memory 320 may store computer executable instructions.

The processor 330 is a configuration for controlling the overall operation of the server 300. The processor 330 may be implemented as, for example, a CPU, ASIC, SoC, MICOM, or the like. The processor 330 may operate an operating system or an application program to control a plurality of hardware or software components connected to the processor 330, and may perform various data processing and operations. According to one embodiment, the processor 330 may further include a graphics processing unit (GPU) and/or an image signal processor. The processor 330 may execute the computer-executable instructions to perform the functions of the server 300 according to various embodiments of the disclosure.

The user can generate an own account in the server 300 using a PC, a smart phone, or the like. For example, a user terminal device 500 shown in FIG. 11 can be used. The user can access the web page for account generation through the user terminal device 500 or execute the application for generating a user account. A web page or an application provides a UI screen for a new subscription, and a user can create an account through inputting an ID, a password, and the like to be used on the UI screen. The user can input the ID and password at a later time and log in to his or her account of the server 300 or log in using another way.

In particular, according to one embodiment of the disclosure, a user may log in to his or her account of the server 300 by voice. In order to use the voice log-in function, for example, the user enters an ID and a password into the user terminal device 500 to log into his or her account of the server 300 and speaks to a microphone provided in the user terminal device 500, and then the user's voice can be transmitted to the server 300. In this case, the user's smartphone may be required to make a specific statement to obtain the feature information of the user's voice to be used for log-in. For example, the message "This is a voice registration procedure for using the voice log-in method. Please say the following words in order" may be displayed on the user terminal device 500. Then, when the user speaks, the user terminal device 500 may transmit the user's voice to the server 300, the server 300 may acquire the voice feature information from the received voice, and may store the voice feature information in the memory 320 as the voice log-in information. The user can log in to the own account in the server 300 only by speaking through the microphone provided in the user terminal device 500 or the second device 200. Specifically, when the server 300 receives voice from the user terminal device 500 or the second device 200, the server 300 may acquire the voice feature information from the received voice, and when the acquired voice feature information corresponds to the voice feature information of a user pre-registered in the memory 320, log-in to the corresponding user account can be performed.

The server 300 may perform a voice recognition function using artificial intelligence (AI) technology. For example, the speech recognition model which is learned using the AI algorithm may be stored in the server 300.

When voice (audio data) is received from the second device 200 through the communicator 310, the processor 330 may determine whether the voice is of a registered user, and acquire context information from the voice using the speech recognition model. For example, if the received voice is "register the refrigerator", it can be determined that the context of the voice means registration of the refrigerator.

If the voice received from the second device 200 through the communicator 310 is related to the registration of the first device 100, the processor 330 may control the communicator 310 to transmit information regarding the first device 100 to the second device 200. The information about the first device 100 may include a name of the first device 100. The information about the first device 100 transmitted to the second device 200 is information for allowing the second device 200 to identify the first device 100 among the scanned peripheral devices, and may include information corresponding to the SSID of the first device 100, or information corresponding to the service protocol.

Figure 7:
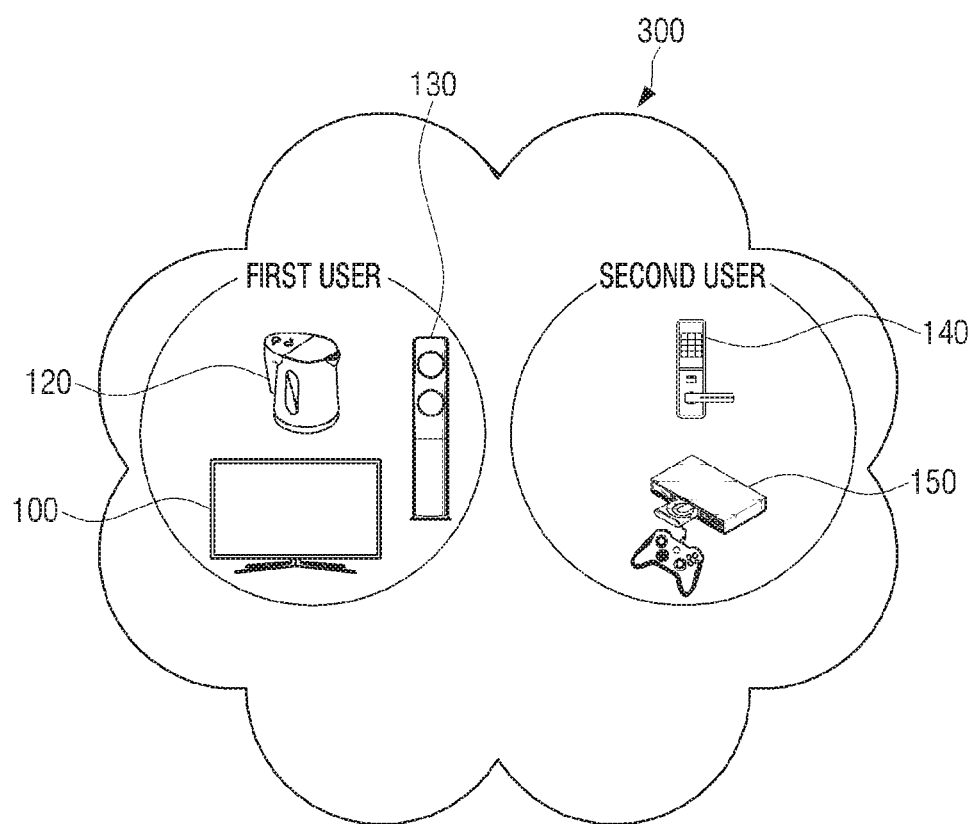
FIG. 7 is views to describe an embodiment to register devices by user accounts to a server according to an embodiment of the disclosure.

Thereafter, when a registration request for the first device 100 is received from the second device 200, the processor 330 may perform the registration procedure for the first device 100. An account by users is managed in the server 300, and the first device 100 can be registered in a specific user account. For example, as shown in FIG. 7, a device may be registered for each user. The first device 100, the third device 120 and the fourth device 130 are registered in the account of the first user and the fifth device 140 and the sixth device 150 are registered in the account of the second user. The devices registered in the server 300 have unique IDs, and the devices registered in the account of one user can have the same group ID. The unique ID and group ID can be used for device control and management. The devices can store a unique ID, a group ID, and can be used for connection to the server 300.

FIG. 7 is views to describe an embodiment to register devices by user accounts to a server according to an embodiment of the disclosure.

The processor 330 may, if the voice received from the second device 200 is related to registration of a plurality of devices, control the communicator 310 to transmit information on the plurality of devices to the second device 200.

According to an embodiment, it is possible to register a device to a user account based on a voice.

For example, when the voice received from the second device 200 corresponds to the voice of the first user registered in the processor 330 and the registration request for the first device is received from the second device 200, the processor 330 may register the first device to the account of a first user. That is, if the voice is a voice of the first user, the device can be registered to an account of the first user, and if the voice is a voice of the second user, the device can be registered to an account of the second user.

The memory 320 of the server 300 may store the voice feature information of the first user and the voice feature information of the second user and the processor 330 may, if the received voice is for registration of a device, compare the received voice feature information with voice feature information of pre-registered users to identify a user corresponding to the voice, and register a device to an account of the identified user.

According to an embodiment, the devices registered to an account of the first user can be set so that the first user can exclusively use, and devices registered to an account of the second user can be set so that the second user can exclusively use. This setting can be done at the registration stage, or after registration in accordance with a user's manipulation.

If the first device 100 of the first user is set to use the first user exclusively, information may be required to authenticate the first user to use the first device 100. For example, when the first device 100 is to be used, the first device 100 may request biometric information (voice, face, fingerprint, iris, etc.), password, pattern, etc. of the first user as authentication information. Only in the case where the authentication information is input, the first device 100 can be used.

According to an embodiment, a device can be registered as a common device. The device which is registered for a common use can be used by users of a predetermined group.

Figure 8:
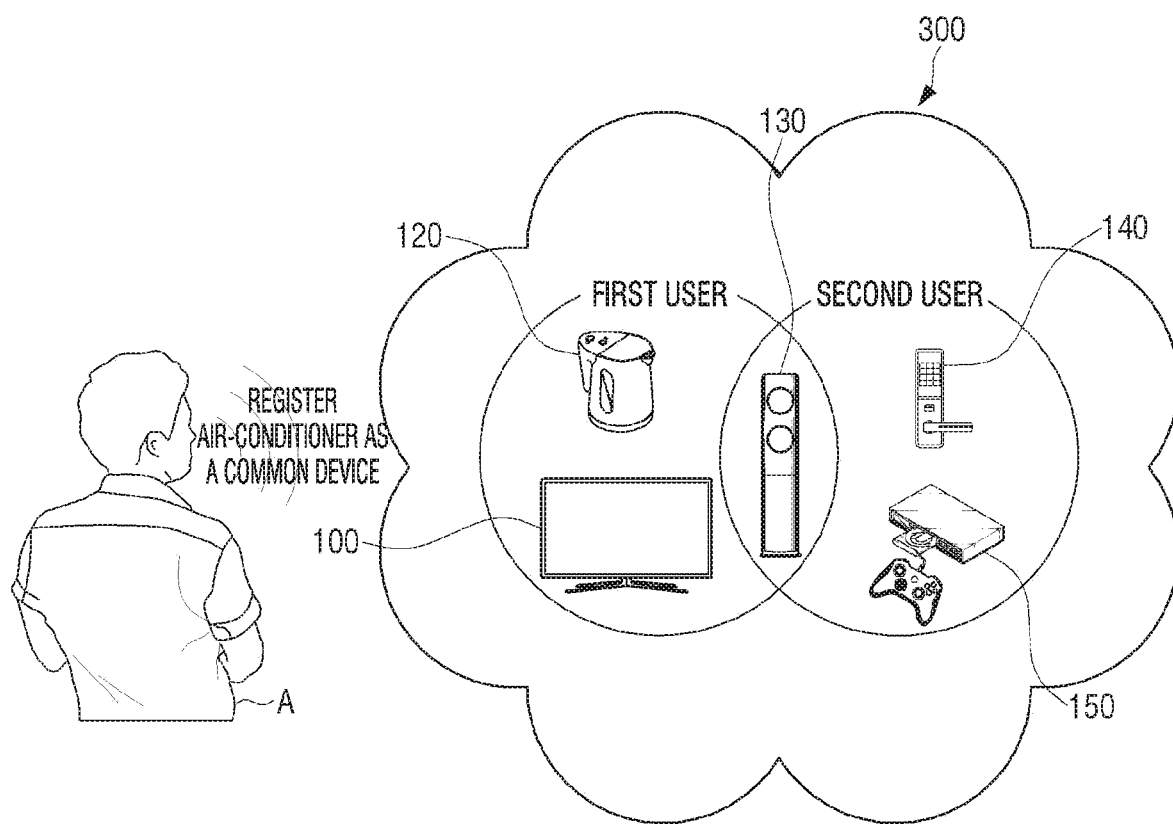
FIG. 8 is views to describe another embodiment to register devices by user accounts to a server according to an embodiment of the disclosure.

FIG. 8 is a view to describe this embodiment to register devices by user accounts to a server according to an embodiment of the disclosure.

Referring to FIG. 8, when the first user A says "register air-conditioner as a common device", the voice is input through the microphone 210 of the second device 200, and can be transmitted to the server 300. The server 300 can recognize that the voice is the voice of the first user A, and may, from among devices registered to an account of the first user A, register the air-conditioner 130 to an account of the second user who belongs to a same group as the first user. Accordingly, not only the first user but also the second user can use the air-conditioner 130.

In the above-described embodiment, it has been described that the devices already registered in the accounts of the first user A are registered as common devices, but it is also possible to register a new device not registered in any user's account as a common device. For example, when the user wishes to newly register the air-conditioner, if the user speaks "register the air-conditioner as a common device," the voice can be inputted through the microphone 210 of the second device 200 and transmitted to the server 300. The server 300 may analyze the voice and transmit, to the second device 200, the information indicating that the information on the air-conditioner and the air-conditioner are to be registered, and the second device 200 may perform a registration procedure as described above with reference to FIG. 3, and the second device 200 may transmit, to the server 300, a registration request requesting registration of the air-conditioner as a common device. The server 300, when a registration request is received, may register the air-conditioner to an account of the first user and an account of the second user belonging to the same group as the first user.

As in the above-described embodiments, devices may be registered in accounts of all users belonging to the same group, or according to still another example, a user who may use the device together may be designated and registered. For example, if the first user says "register the air-conditioner to be used along with Jane (second user)", the air-conditioner can be registered in the accounts of the first user and the second user.

According to the embodiments described above, since the account can be managed by the voice recognition of the user and the user other than the registered user cannot use it, the privacy management can be performed. For example, by simply saying "register TV as my device," it is possible to register the device as a personal device, and by only simply "register TV as a common device," it is possible to register the device as a common device. Therefore, even users who are not familiar with the IoT device of the related art can register the device easily.

According to one embodiment of the disclosure, the first device 100 registered in the account of the first user can be set such that the first user can exclusively use, and a device registered to an account of the second user can be set so that only the second user can exclusively use. For example, the first device 100 can be used only when pre-registered authentication information is input. The authentication method may be password input, voice recognition, face recognition, and the like. It is also possible for the user to directly input information for authentication for cancelling exclusive use to the first device 100 and to input the information for authentication through the second device 200 or another device. For example, when the voice of the first user A desiring to cancel the exclusive use of the first device 100 through the microphone 210 of the second device 200 is received, the second device 200 may transmit the voice to the server 300, and the processor 330 may control the communicator 310 to transmit the control information for cancelling exclusive use of the first device 100 to the first device 100.

The voice of the first user A to cancel the exclusive use can be a voice to register the first device 100 as a common device as described above.

According to still another embodiment, the voice of the first user who wishes to cancel the exclusive use may be a voice to temporarily permit the use of the first device 100 to another user. In this case, the processor 330 may temporarily transmit to the first device 100 the control information allowing the use of the other user.

Figure 9:
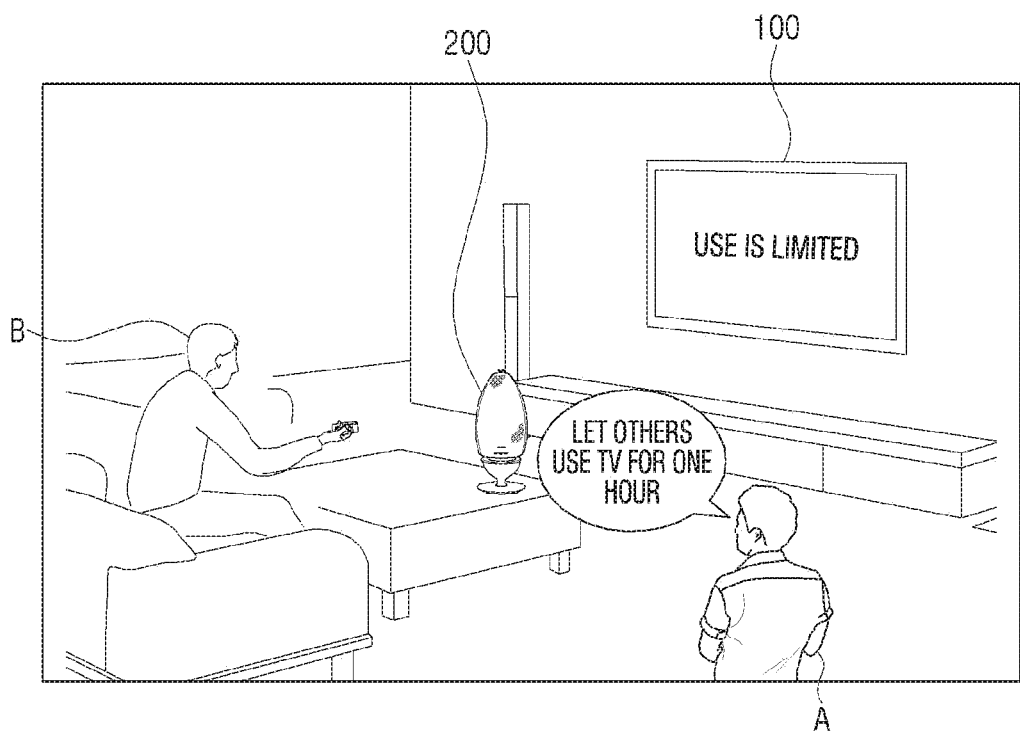
FIG. 9 is a view to describe an embodiment to cancel an exclusive use of the device according to an embodiment of the disclosure.

FIG. 9 is a view to describe an embodiment to cancel an exclusive use of the device according to an embodiment of the disclosure.

FIG. 9 shows a case where, when the TV 100 (e.g., the first device 100) is registered to the account of the first user A and the TV 100 is set to be exclusively used for the first user, a second user B wishes to use the TV 100. When the second user B wishes to use the TV 100 (for example, press a power button of a remote controller or a power button of TV), the TV 100 may request authentication information. In this case, the TV 100 can output a message such as "Please make the remote control read your fingerprint for using TV" and "use is limited." As illustrated in FIG. 9, the message can be output from the TV 100, and the TV 100 may send information informing the access of the unauthenticated user to the second device 200 and it is possible for the second device 200 to output the message. For example, if the second device 200 includes a speaker, a voice such as "the use of the TV is limited" may be output.

Thereafter, when the first user A utters a voice "let others use a TV for one hour", the voice is input through the microphone of the second device 200, and the second device 200 may transmit the voice to the server 300. The server 300 can analyze voice, determine that the first user A wishes to cancel the exclusive use of the TV 100 for an hour, and transmit control information to the TV 100 for use of the TV 100 during one hour.

According to still another embodiment, when the first user A does not designate use time and speak, for example, "let others use TV as well", the TV 100 can be used by others during a preset time or until the TV 100 is turned off.

According to still another embodiment, the first user A may designate the second user B to use the TV 100. For example, if it is said that "let Jane (second user) use the TV", the second user B only can use the TV for a certain period of time and the other user can use the TV 100.

According to the above-described embodiments, parental control such as restriction of the use of children's game machines is possible. For example, when a child attempts to control a game machine registered with the parent's voice, "use of this device is limited" is output. Then, if the parent who registered the game machine by voice says "allow use for one hour," the limitation can be cancelled for temporary use. In addition, this embodiment can be used for lock/unlock a safe or a personal storage space.

Figure 10:
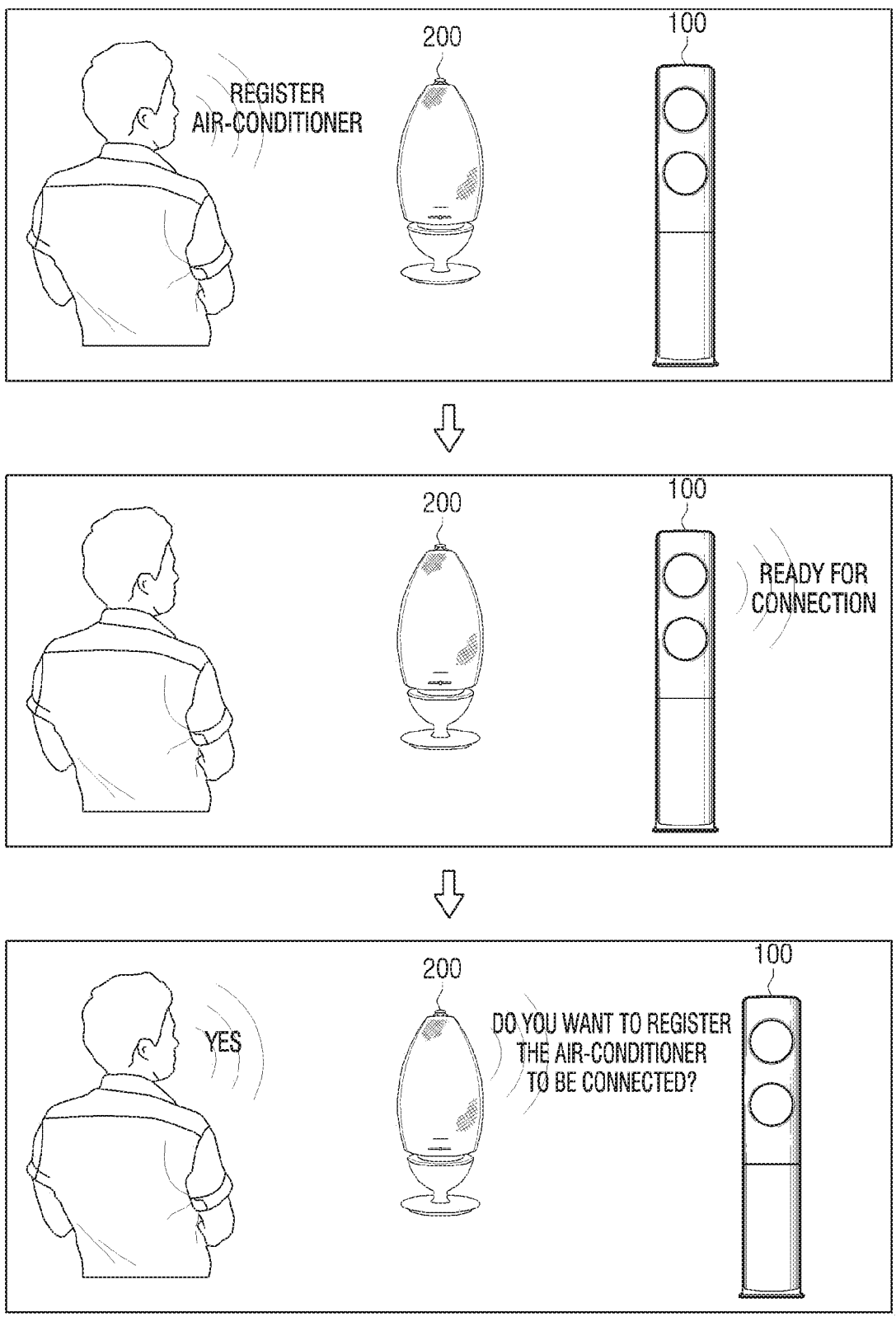
FIG. 10 is a view to describe an embodiment to request confirmation from a user to register a device according to an embodiment of the disclosure.

FIG. 10 is a view to describe an embodiment to request confirmation from a user to register a device according to an embodiment of the disclosure.

FIG. 10 is a view to describe a procedure to confirm with a user to prevent a device, which a user does not wish to register, from being registered.

The second device 200 may acquire information about a device that the user wants to register from the received user voice, search an external device 100 (e.g., the first device 100) corresponding to the acquired information, communicate with the external device 100 through a communication connection, and transmit control information to the external device 100 so that information indicating that the external device is to be registered is outputted from the external device 100.

The second device 200, when a plurality of external devices corresponding to the information acquired from the voice are searched, may establish communication connection with a device having greatest signal intensity (for example, beacon) and transmit control information to output to the connected external device information indicating that an external device is to be registered.

The first device 100 receiving the control information from the second device 200 may output information indicating that the first device 100 is ready for connection. For example, it is possible to output a voice message such as "ready for connection". Such sound source files may be prestored in the device. It is also possible to visually output information indicating that the device is ready for connection.

Thereafter, the second device 200 may output information for inquiring whether to register the external device 100. For example, as shown in FIG. 10, the second device 200 can output an inquiry voice such as "Do you want to register the air-conditioner to be connected?" through a speaker. If a voice (for example, "yes" "register, please", etc.) to agree to the inquiry voice is received through the microphone 210, the second device 200 may transmit the information on the AP 400 and the server authentication information to the external device 100. Then, the registration procedure can then be performed as described in FIG. 3.

When information inquiring whether or not the second device 200 registers the external device 100 is output, and when a voice (for example, "No," "do not register") not to agree to the inquiry voice is received, the second device 200 can terminate the registration procedure. Alternatively, if several devices are searched, communication connection can be established with a device having signal intensity which is second largest and have the same check process as described above.

According to an embodiment described above, accurate registration of a device intended by a user can be made.

When the first device 100 is registered in the server 300, the user can control the device. According to one embodiment, the user can control the first device 100 by voice using the second device 200. For example, when a first user who has registered the first device 100 as a voice speaks "Turn on TV (first device)", the second device 200 receives the voice and transmits the voice to the server 300, and the server 300 transmits a turn-on control command to the first device 100 registered in the account of the first user, and the first device 100 receiving the control command can be turned on.

According to another embodiment, it is also possible to control the first device 100 using a device other than the second device 200. Examples of other devices include smartphones, tablets, digital TVs (DTVs), and the like. Here, these devices are called user terminal devices.

Figure 11:
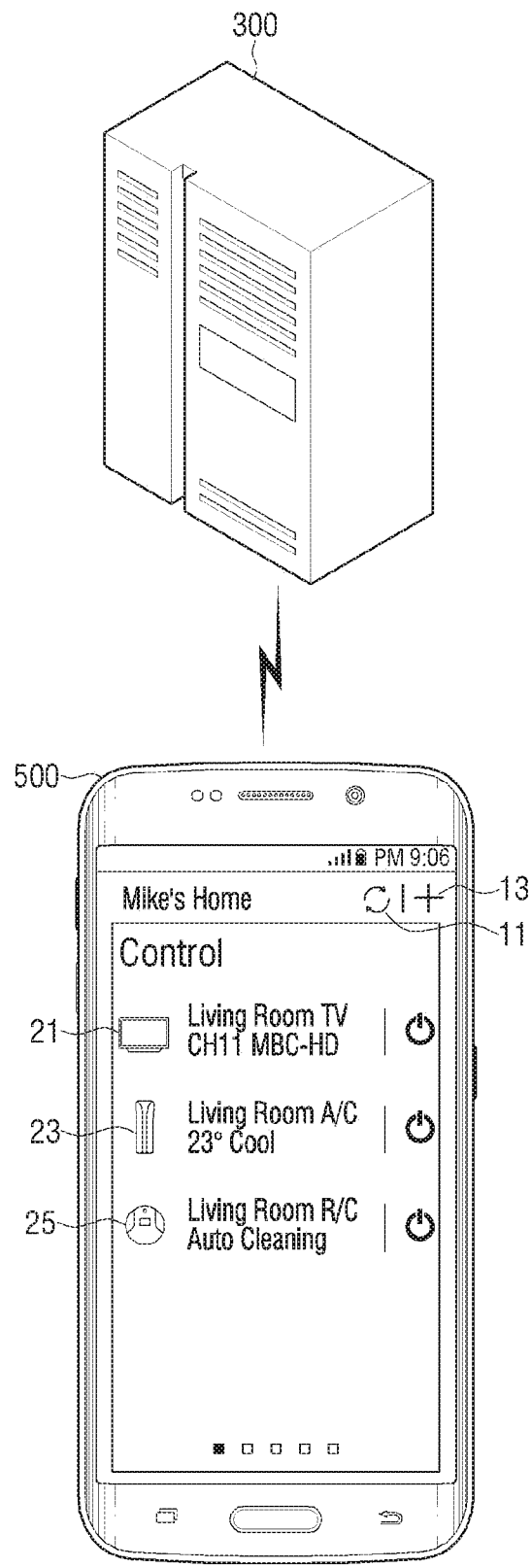
FIG. 11 is a view to describe a user terminal device according to an embodiment to communicate with a server according to an embodiment of the disclosure.

FIG. 11 is a view to describe a user terminal device to communicate with a server according to an embodiment of the disclosure.

Referring to FIG. 11, a user terminal device 500 is a device registered to the server 300 such as the first device 100 and can be used for the purpose to control other registered devices.

An application executed in the user terminal device 500, for example, a smart home application or the like, is used to access the server 300 to register a device, or information on the pre-registered device can be read or deleted. Control information for integrated control of the devices can be registered or registered control information can be read or deleted.

When the smart home application is executed in the user terminal device 500, at the same time as the execution of the smart home application, the user terminal device 500 may automatically log in to its own account in the server 300 through a prestored user identifier (ID) and a password. For some cases, by receiving the ID and password from a user, a user's account in the server 300 can be logged in. The log-in information is maintained for a predetermined period unless a user logs out, so within the effective period during which log-in information is maintained, it is not necessary for a user to log in to the server 300 every time.

When the first user logs in through the user terminal device 500, information to control the devices of the first user registered in the server 300 can be transmitted to the user terminal device 500. The user terminal device 500 may configure and display a control screen based on received information. FIG. 11 illustrates an example of a control screen displayed in the user terminal device 500.

The user terminal device 500 may display a control screen including a list of devices 21, 23, 25 registered to the account of the first user (Mike). A user may control the devices 21, 23, and 25. For example, power of the devices 21, 23, and 25 can be turned on or turned off through a control screen.

The server 300 can manage status information through periodic communication with devices registered in the account of the first user and can transmit status information to the user terminal device 500. In the user terminal device 500, status information of the devices can be displayed. For example, as illustrated in FIG. 11, status information indicating that a broadcast program of CH11 is being broadcast on the TV 21, the air-conditioner 23 is operating at 23 degrees, and the robot cleaner is in the automatic cleaning mode can be displayed on the user terminal device 500.

When the information is updated in the server 300, updated information can also be displayed in the user terminal device 500. For example, when a new device is registered in the server 300, a new device can be displayed on the control screen of the user terminal device 500. According to one embodiment, the control screen displayed on the user terminal device 500 includes a menu 11 for updating information. When the menu 11 is selected, the user terminal device 500 may request information update to the server 300. Accordingly, when a new device is registered by voice through the second device 200, a new device can be displayed also in the user terminal device 500.

According to an embodiment of the disclosure, not only a device can be registered by voice through the second device 200, but a device can also be registered through the user terminal device 500. When the menu 13 for registering a device is selected, the user terminal device 500 displays a list of devices searched for by searching external devices in the vicinity, and when the user selects a device to be registered in the list, the user terminal device 500 may register the selected device with the server 300.

Figure 12:
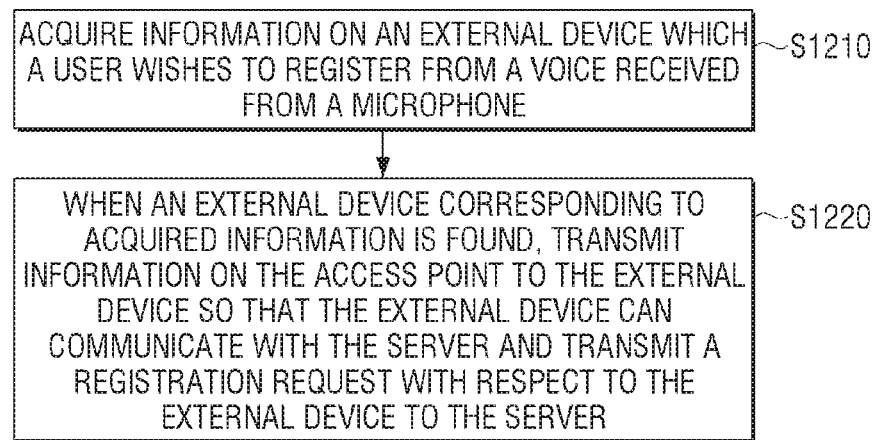
FIG. 12 is a flowchart to describe a controlling method of an electronic apparatus according to an embodiment of the disclosure.

FIG. 12 is a flowchart to describe a controlling method of an electronic apparatus according to an embodiment of the disclosure. The flowchart on the controlling method of the electronic apparatus of FIG. 12 can be configured with operations processed by the second device 200 described in this specification. That is, the electronic apparatus can be the second device 200. Therefore, even if the description is omitted, the description relating to the second device 200 can be applied to the flowchart of FIG. 26.

The electronic apparatus is a device which includes a microphone. Referring to FIG. 12, the electronic apparatus may acquire information on an external device which a user wishes to register from a voice received from a microphone in operation S1210.

In this case, the electronic apparatus may transmit a voice received through the microphone to the server and receive information on the external device from the server.

When the external device corresponding to the acquired information is found, the electronic apparatus may transmit information on the AP to the external device so that the external device can communicate with the server, and transmit a registration request with respect to the external device to the server in operation S1220.

In this case, the electronic apparatus may search for an external device whose SSID includes information on the acquired external device.

When information with respect to the plurality of devices which a user wishes to register is acquired from the voice received through the microphone, the information on the AP can be transmitted sequentially to the plurality of external devices and a registration request with respect to the plurality of external devices to the server.

When information about an external device to be registered by the user is obtained from the voice, the electronic apparatus may transmit control information for causing the external device to output information informing that the external device is a registration target to the external device and output voice of inquiry about the registration of the external device through the speaker of the electronic apparatus. The electronic apparatus may transmit information on the access point to the external device and transmit a registration request for the external device to the server when a voice agreeing with the voice of the inquiry is received through the microphone.

In the meantime, when audio data including voice informing completion of registration of the external device is received from the server, the electronic apparatus may output audio data through the speaker.

According to the aforementioned embodiments, a device registration procedure of a network management service in which devices are connected via network and managed at home and plants can be done easily using a voice, and the registered device can be controlled using the voice, thus user convenience can be improved.

The various embodiments described above may be implemented in software, hardware, or a combination thereof. In accordance with a hardware implementation, the embodiments described in this disclosure may be implemented by using at least one of application specific integrated circuits (ASICs), digital signal processors (DSPs), digital signal processing devices (DSPDs), programmable logic devices (PLDs), field programmable gate arrays (FPGAs), a processor, a controller, a micro-controller, a microprocessor, and an electrical unit for performing other functions. According to a software implementation, embodiments such as the procedures and functions described herein may be implemented in separate software modules. Each of the software modules may perform one or more of the functions and operations described herein.

The various embodiments of the disclosure may be implemented as software that includes instructions that may be stored in machine-readable storage media readable by a machine (e.g., a computer). A device may call instructions from a storage medium and that is operable in accordance with the called instructions, including an electronic apparatus (e.g., the first device 100, the second device 200, the server 300, and the user terminal device 500). When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

According to one embodiment, a method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of online distribution, at least a portion of the computer program product may be stored temporarily or generated temporarily in a storage medium such as a manufacturer's server, a server of an application store, or a memory of a relay server.

Each of the components (for example, a module or a program) according to various embodiments may be composed of one or a plurality of objects, and some subcomponents of the subcomponents described above may be omitted, or other subcomponents may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristic manner, or at least some operations may be performed in a different order, omitted, or other operations can be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus, comprising:
a communication circuit;
a memory for storing instructions; and
at least one processor electrically connected to the memory,
wherein the at least one processor, upon execution of the instructions, is configured to:
based on a first mode of an external device being turned on, establish communication with the external device,
based on the communication being established, control the communication circuit to transmit information on an access point to the external device to enable the external device to be registered in a server,
based on the external device being registered in the server, receive status information of the external device and control information to control the external device from the server at a time a smart home application is initiated on the electronic apparatus or the external device is registered, and
control the external device based on the control information to control the external device.

2. The electronic apparatus of claim 1, wherein the at least one processor is further configured to:
register the external device in the server and control the external device through the smart home application.

3. The electronic apparatus of claim 1, further comprising a display,
wherein the at least one processor is further configured to:
based on the external device being registered in the server, control the display to display a user interface (UI) including the status information on the external device.

4. The electronic apparatus of claim 3, wherein the at least one processor is further configured to:
control the external device through the UI.

5. A method of an electronic apparatus, the method comprising:
based on a first mode of an external device being turned on, establishing communication with the external device;
based on the communication being established, transmitting information on an access point to the external device to enable the external device to be registered in a server;
based on the external device being registered in the server, receiving status information of the external device and control information to control the external device from the server at a time a smart home application is initiated on the electronic apparatus; and
controlling the external device based on the control information to control the external device.

6. The method of claim 5, further comprising:
registering the external device in the server and control the external device through the smart home application.

7. The method of claim 5, further comprising:
based on the external device being registered in the server, displaying a user interface (UI) including the status information on the external device.

8. The method of claim 7, further comprising:
controlling the external device through the UI.

9. A non-transitory computer-readable medium storing thereon instructions, the instructions when executed by at least processor, perform a method of an electronic apparatus, the method comprising:
- based on a first mode of an external device being turned on, establishing communication with the external device;
- based on the communication being established, transmitting information on an access point to the external device to enable the external device to be registered in a server;
- based on the external device being registered in the server, receiving status information of the external device and control information to control the external device from the server at a time a smart home application is initiated on the electronic apparatus; and
- controlling the external device based on the control information to control the external device.

10. The non-transitory computer-readable medium of claim 9, further comprising:
- registering the external device in the server and control the external device through the smart home application.

11. The non-transitory computer-readable medium of claim 9, further comprising:
- based on the external device being registered in the server, displaying a user interface (UI) including the status information on the external device.

12. The non-transitory computer-readable medium of claim 11, further comprising:
- controlling the external device through the UI.

* * * * *